United States Patent
Stetson et al.

(10) Patent No.: US 9,961,246 B2
(45) Date of Patent: May 1, 2018

(54) NON-CANTING VCM-ACTUATED AUTOFOCUS

(71) Applicant: Google Inc., Mountain View, CA (US)

(72) Inventors: Philip Sean Stetson, Wexford, PA (US); Guangxun Liao, San Jose, CA (US)

(73) Assignee: Google LLC, Mountain View, CA (US)

( * ) Notice: Subject to any disclaimer, the term of this patent is extended or adjusted under 35 U.S.C. 154(b) by 53 days.

(21) Appl. No.: 15/175,318

(22) Filed: Jun. 7, 2016

(65) Prior Publication Data
US 2016/0373626 A1    Dec. 22, 2016

Related U.S. Application Data (60) Provisional application No. 62/181,516, filed on Jun. 18, 2015.

(51) Int. Cl.
| | |
|---|---|
| *H04N 5/225* | (2006.01) |
| *H04N 5/247* | (2006.01) |
| *H04N 5/33* | (2006.01) |
| *H04N 5/232* | (2006.01) |

(52) U.S. Cl.
CPC ......... *H04N 5/2254* (2013.01); *H04N 5/2257* (2013.01); *H04N 5/2258* (2013.01); *H04N 5/23212* (2013.01); *H04N 5/247* (2013.01); *H04N 5/332* (2013.01)

(58) Field of Classification Search
CPC ... G03B 5/00; G03B 3/00; G03B 3/02; G03B 13/36; G03B 2205/0053; G06K 9/209; H04N 5/2254
See application file for complete search history.

(56) References Cited

U.S. PATENT DOCUMENTS

| | | | | |
|---|---|---|---|---|
| 7,697,832 B2* | 4/2010 | Yamamoto | ............... | G02B 7/08 348/349 |
| 8,073,320 B2 | 12/2011 | Topliss et al. | | |
| 2010/0033851 A1* | 2/2010 | Oh | ............ | G02B 7/08 359/823 |
| 2011/0211822 A1* | 9/2011 | Kikuchi | ................ | G02B 7/305 396/125 |
| 2012/0075720 A1* | 3/2012 | Iikawa | ..................... | G02B 7/10 359/695 |
| 2012/0320254 A1* | 12/2012 | Ogino | ...................... | G02B 7/08 348/345 |
| 2013/0258140 A1* | 10/2013 | Lipson | ..................... | G03B 3/10 348/240.3 |
| 2013/0329106 A1 | 12/2013 | Bigioi et al. | | |
| 2014/0066122 A1 | 3/2014 | Shukla et al. | | |
| 2015/0288865 A1* | 10/2015 | Osborne | ............. | H04N 5/2624 348/218.1 |

* cited by examiner

*Primary Examiner* — Kelly L Jerabek
(74) *Attorney, Agent, or Firm* — Colby Nipper (57) ABSTRACT

Techniques and apparatuses are described that enable non-canting VCM-actuated autofocus. These techniques and apparatuses enable multiple focal distances that are substantially free of imaging errors caused by canting of a lens housing. These multiple focal distances are provided by multiple positions of a lens housing relative to an image sensor. These positions can be free of cant through use of mechanical stops and corresponding mechanical stop-mates. By so doing, lower cost, faster focusing, higher image quality, lower power, or lower settling time can be achieved.

20 Claims, 13 Drawing Sheets

Prior Art

NON-CANTING VCM-ACTUATED AUTOFOCUS

RELATED APPLICATIONS

This application claims priority under 35 U.S.C. § 119(e) to U.S. Patent Provisional Application Ser. No. 62/181,516 filed Jun. 18, 2015, the disclosure of which is incorporated by reference herein in its entirety.

BACKGROUND

Currently, small and thin cameras have a collection of lenses that are moved to and from an image sensor to focus on a particular scene. To make this movement of the lenses, many devices rely on voice-coil motors (VCMs), which use some form of mechanical spring along with an electromagnet. The spring draws the lenses one direction and the electromagnet, under control of the device, moves the lenses an opposite direction. These lens elements are often placed within a barrel or cylindrical housing, which moves along a track within another structure. These current structures permit good imaging for cameras within small or thin devices.

These current devices, however, permit the housing to cant or tilt. This canting, even at a very small angle, can reduce image quality, especially for array cameras. Array cameras have multiple image sensors and lens collections to capture multiple images. Array cameras then combine these multiple captured images to create a final resulting image that is of high quality. The quality of this resulting image, however, can be substantially reduced with even a very small amount of cant in any one of the lens collections.

The cant is often caused by the springs and the electromagnets not being in perfect balance, for example, one spring being stronger than the other or one area of the electromagnet having a stronger force on it, or caused by it, than another area. When this happens, two problems arise, a loss of focus on some area of the image sensor or an image capture that is misaligned. The first problem affects even a camera with a single image sensor, while both affect array cameras. Loss in image quality for array cameras can also be due to the effect on the camera's intrinsic matrix when different lens collections cant differently, which adversely affects array camera calibration, causing the eventual fused image to be fused improperly.

This background description is provided for the purpose of generally presenting the context of the disclosure. Unless otherwise indicated herein, material described in this section is neither expressly nor impliedly admitted to be prior art to the present disclosure or the appended claims.

BRIEF DESCRIPTION OF THE DRAWINGS

Apparatuses of and techniques enabling non-canting VCM-actuated autofocus are described with reference to the following drawings. The same numbers are used throughout the drawings to reference like features and components.

DETAILED DESCRIPTION

Figure 1:
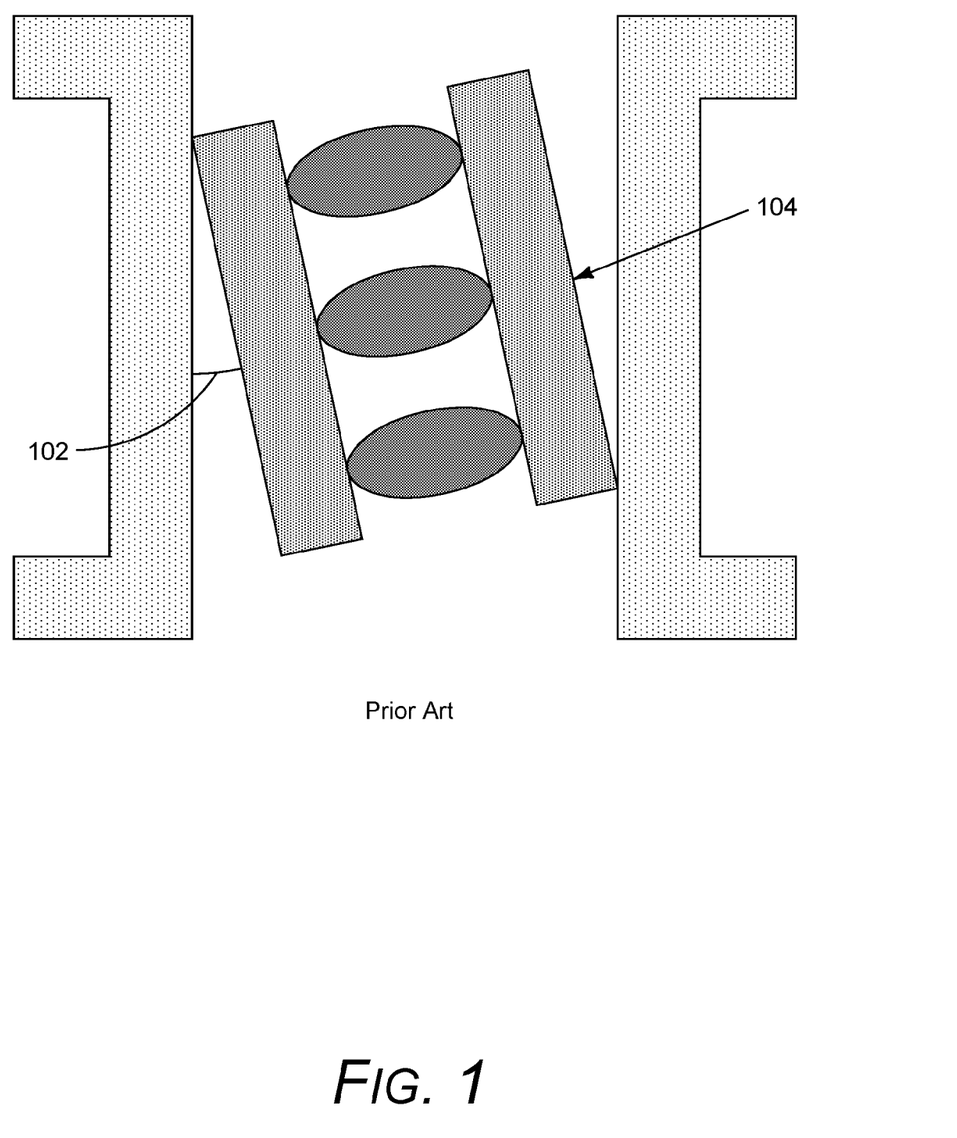
FIG. 1 illustrates cant of a lens housing.

Voice-Coil Motors (VCMs) are a common and conventional mechanism to autofocus a camera, especially those with thin form factors present in smartphones and tablets. VCMs use a combination of springs and electromagnetic force to adjust a position of a lens relative to an image sensor to focus on an object. VCMs suffer from an effect called dynamic tilt, where the lens is not moved evenly through the focus range. Instead, small mismatches in components cause the lens to tilt or "cant" at various positions of a lens relative to an image sensor. This is shown in exaggerated form in FIG. 1 with a cant angle 102 of a lens housing 104 of a VCM-actuated camera. Note that even very small cant angles can negatively affect image quality, for example 0.1 to 1.0 degree.

As discussed, the VCM uses a combination of springs and electromagnetic force to position the lens housing. The cant problem occurs due to imbalance between these components. During normal operation, the lens (via the lens housing) is positioned close to an image sensor for moderate to far object distances and moves away from the image sensor for close distances, e.g., less than one meter. As the lens housing is moved toward or away from the image sensor, the lens housing can cant or tilt, thereby reducing image quality.

In contrast, techniques and apparatuses are described below that enable non-canting VCM-actuated autofocus. These techniques and apparatuses enable multiple focal distances that are substantially free of imaging errors caused by the above-described canting of a lens housing or, at a minimum, are recurring and thus correctable. These multiple focal distances are provided by multiple positions of a lens housing relative to an image sensor. These positions can be free of cant through use of mechanical stops and corresponding mechanical stop-mates. By so doing, lower cost, faster focusing, higher image quality, lower power, or lower settling time can be achieved. For example, by using a mechanical stop, some positions require little power, low settling times, and less sophisticated controllers due to the positions being set mechanically rather than through use of electromagnets. As noted, higher image quality can also be attained due to reduction or elimination of tilt, which results in image center movement and out-of-focus imaging.

As described below, one-, two-, and three-position VCM cameras are shown, at least one of the positions of which is defined by mechanical stops. These mechanical stops can be built into the structure of the VCM, for example on a lens housing, barrel through which the lens housing moves, or surrounding structures.

These mechanical stops permit sufficient positions to enable 'standard' and 'macro' mode imaging, e.g., imaging of objects that are about 20 centimeters or less and those about 20 centimeters to infinity. With a third optional position, the range of focal imaging can be further expanded, for example to 10-50 centimeters, 50 centimeters to 1.5 meters, and 1.5 meters to infinity. By so doing, cant that is normally exhibited by VCMs can be eliminated or substantially reduced while providing positions necessary to cover a vast majority of imaging situations.

The following discussion first describes an operating environment, then example cameras, a detailed description of an example computing device having a camera, followed by techniques that may be employed in this environment and device, and ends with an example electronic device.

Example Environment

Figure 2:
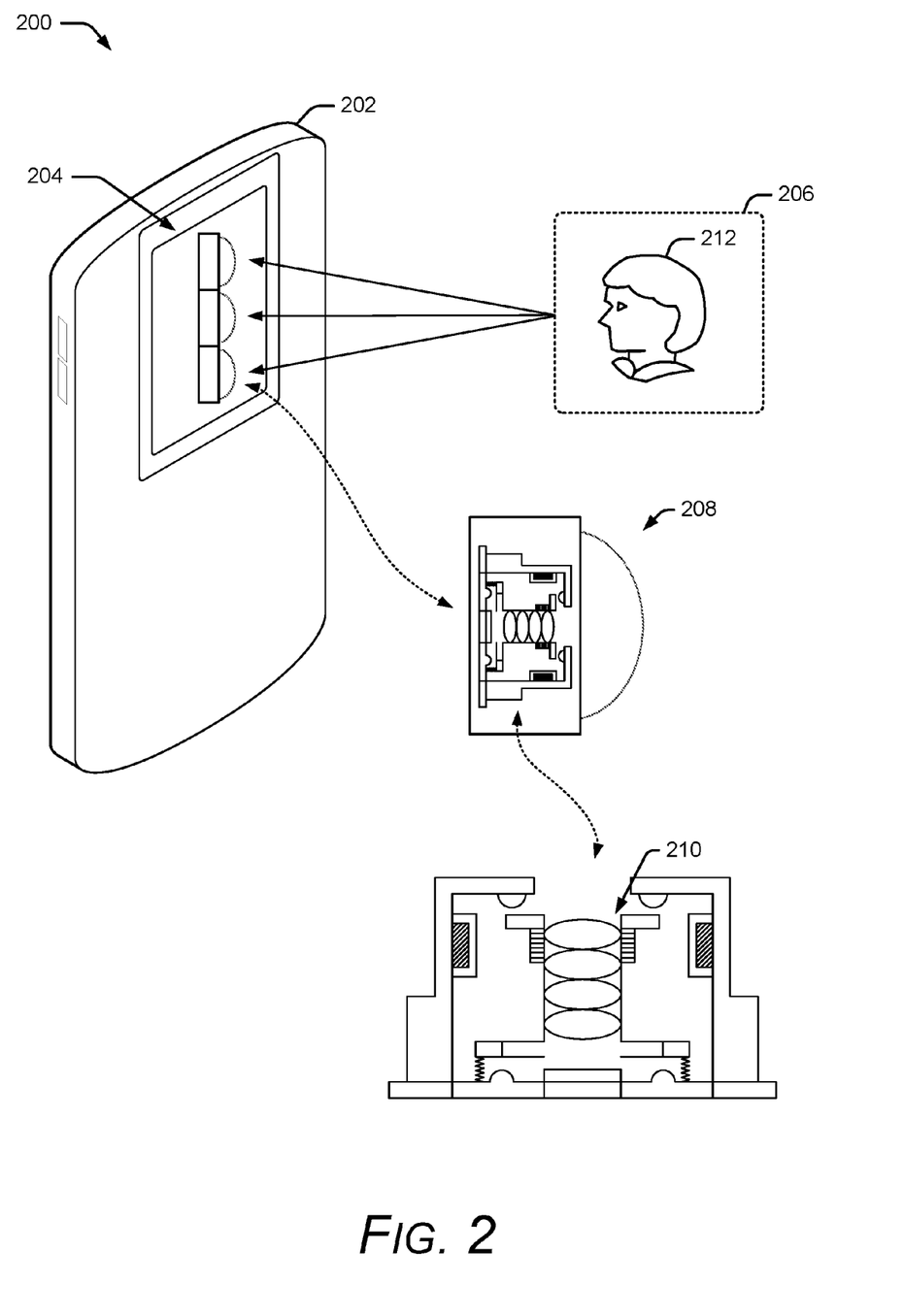
FIG. 2 illustrates an example environment in which non-canting VCM-actuated autofocus can be enabled.

FIG. 2 illustrates an example environment 200 in which non-canting VCM-actuated autofocus can be embodied. Example environment 200 includes a computing device 202 having a camera system 204 capturing images of a scene 206. Camera system 204 includes an array of three image sensors 208, each of which includes a lens stack 210.

Camera system 204 may include one, or be an array of, image sensors 208. When an array, image sensors 208 can be of similar or dissimilar types. Thus, the sensors can have different numbers of pixels, color-sensing of pixels, sizes of pixels, or sensor size.

Figure 3:
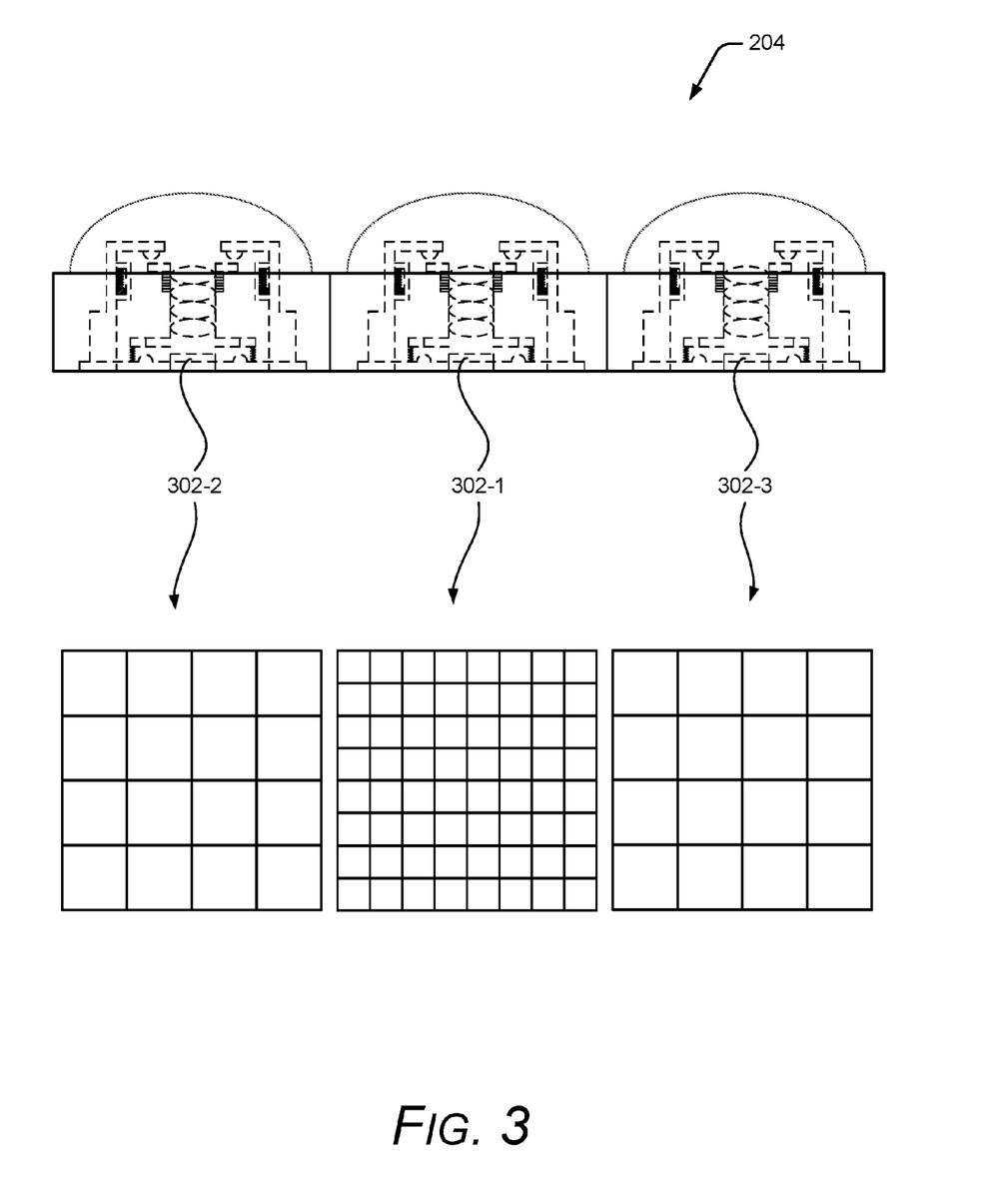
FIG. 3 illustrates example image sensors of a camera system of FIG. 2.

By way of example, consider FIG. 3, which illustrates image sensors 302 of camera system 204. Image sensor 302-1 is monochrome with a clear color filter. This monochrome aspect improves signal-to-noise ratio in low-light situations and can enable a high detail for a given pixel count, or perform better in low-light environments due to an improved signal-to-noise ratio (SNR). Further, image sensor 302-1 may include a filter permitting infrared radiation to be sensed, which may not be desired for color-pixel sensors because infrared radiation inhibits color fidelity, but does permit bandwidth captured by the imager to be expanded into the Near Infrared (NIR). This can improve SNR in low-light scenes, in some cases permitting image capture in near darkness. Image sensors 302-2 and 302-3 have a lower pixel count using larger-pixel color sensors, which increases sensitivity, thereby enabling brighter images with more vivid color.

As this one example shows, array cameras enable various advancements in thin (and non-thin) cameras but, as noted above, rely on post-processing of the images captured by each of the image sensors, in this case two low-pixel-count color images with one high-pixel-count greyscale image, though this is provided as one non-limiting example for illustration only. Cant of the lens stack inhibits this post-processing, as image center movement and focus errors prohibit the highest image quality.

Figure 4:
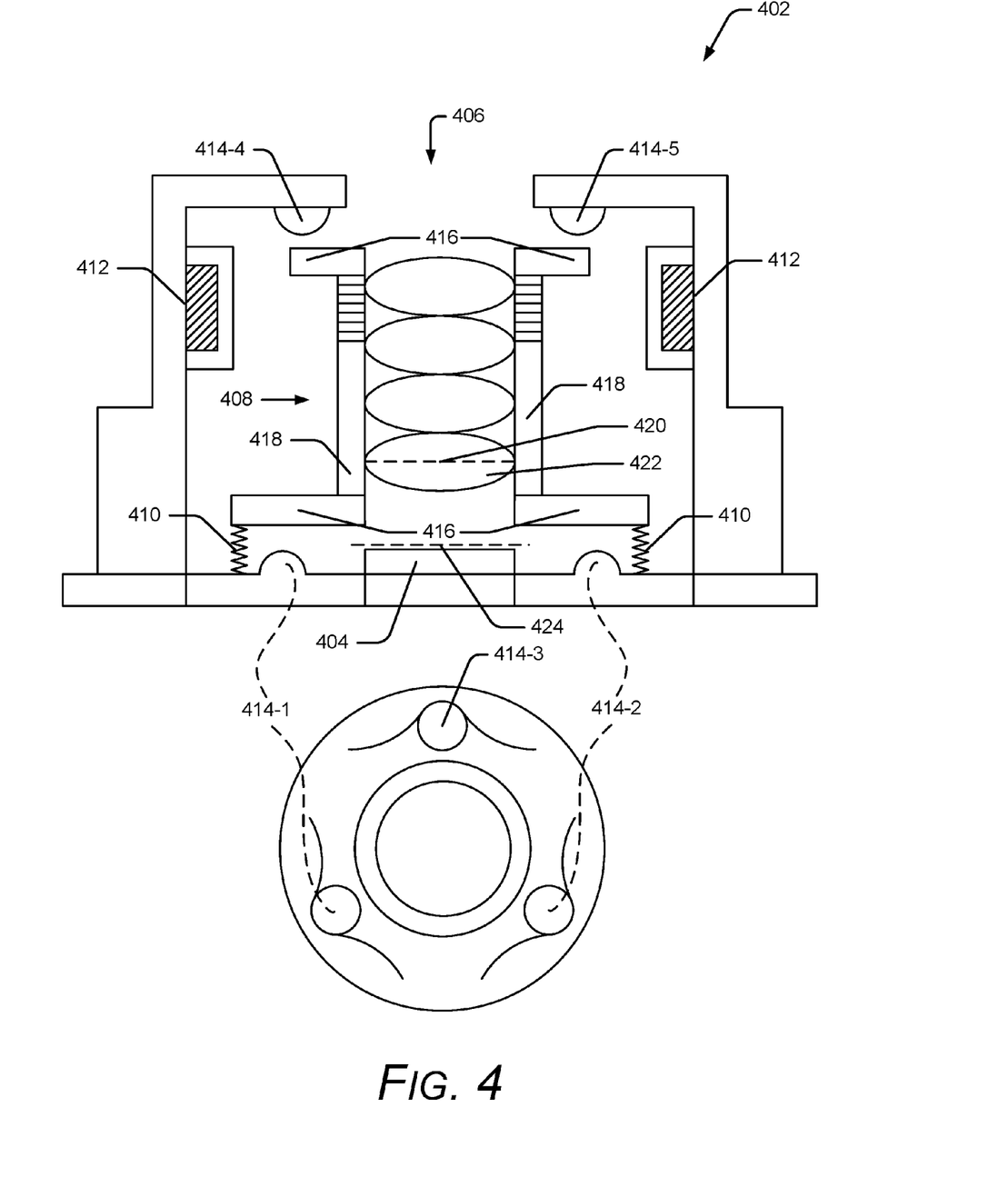
FIG. 4 illustrates a two-position camera system having an image sensor, a lens stack, a lens housing, springs, electromagnets, mechanical stops, and mechanical stop-mates.

With an example of an array camera explained, consider FIG. 4, which illustrates a two-position camera system 402 having an image sensor 404, a lens stack 406, a lens housing 408, springs 410, electromagnets 412, mechanical stops 414, and mechanical stop-mates 416. This camera system 402 is shown in cross-sectional view, while mechanical stops 414-1 and 414-2 are shown in both cross section and plan views. Mechanical stop 414-3 is not shown in cross section but is shown in plan view.

Image sensor 404 can be any of those described herein, for example one of those illustrated in FIG. 3. Lens stack 406 includes one or more lenses used to project light from a scene and, if moved in a correct position, focus light from the scene on to image sensor 404. Lens housing 408 houses lenses of lens stack 406. The particular shape of lens housing 408 can be one of many different shapes and sizes, whether in one or multiple parts. Here a cylindrical shape is implemented. In more detail, lens housing 408 includes a lens-retention section 418 and here is shown including mechanical stop-mates 416 as part of a structure integral with lens housing 408.

As noted in part above, mechanical stops 414 are configured to contact mechanical stop-mates 416 effective to prevent cant of the lens housing. This cant can be prevented such that the lenses are parallel with image sensor 404. In some cases very slight angles exist but this small angle can be accounted for during calibration of the camera system as it should remain consistent. In this illustrated case a planar cross section 420 of lens 422 is parallel to a plane 424 of image sensor 404 for both positions in which mechanical stops 414 contact mechanical stop-mates 416.

The mechanical stops (or sets of them) are both effective to prevent cant of the lens housing, with one at a first position and the other at a second position, where each of the positions having different focal distances to image sensor 404.

Springs 410 provide a spring force by which lens housing is pulled in a direction, which is often in opposition to a magnetic force of electromagnets 412. Electromagnets 412 provide a magnetic force when provided a current by a controller (e.g., in a device having camera system 402). Note that in this case an intermediate position is shown where neither of the mechanical stops are in contact with stop-mates. This is one alternative position described in greater detail below. Here two positions can be provided by the mechanical stops when lens housing 408 contacts, through stop-mates 416, mechanical stops 414-1, 414-2, and 414-3 or 414-4 and 414-5 (one or more other stops may also be included with stops 414-4 and 414-5, which are not shown). As shown, mechanical stops 414-1, 414-2, and 414-3 include three projections arranged effective to define a stop plane that is parallel to planar cross section 420 and plane 424 of image sensor 404.

In some cases, mechanical stops and stop-mates are configured to mate sufficient to prevent cant as well as prevent non-cant movement (e.g., side-to-side) of an image center of the scene on the image sensor. This is illustrated in FIGS. 5, 6, and 7.

Figure 5:
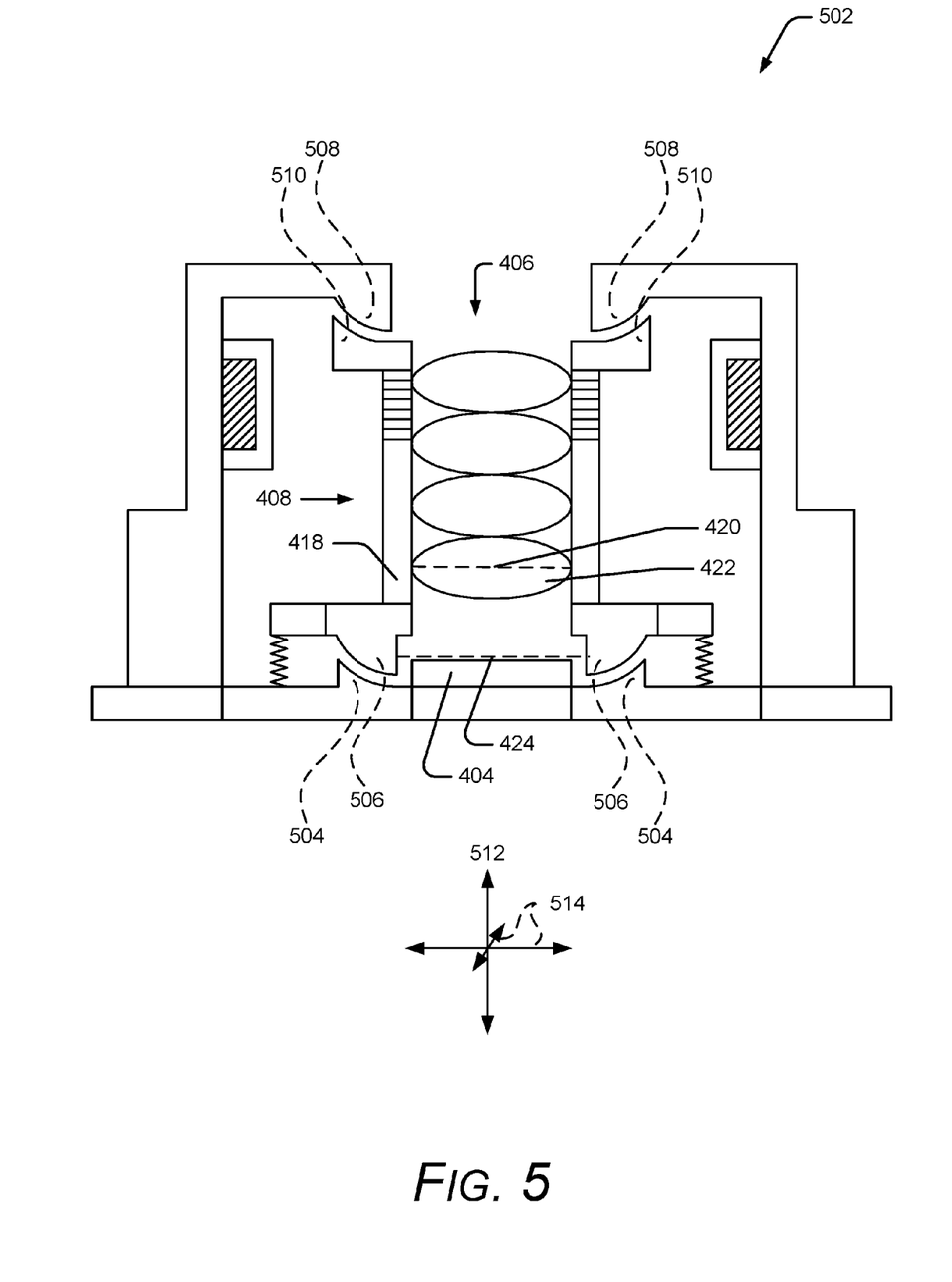
FIGS. 5-7 illustrate convex and concave mechanical stops and stop-mates.

FIG. 5 illustrates convex and concave stops and stop-mates. At one position, camera system 502 includes mechanical stops 504 that are convex that mate to stop-mates 506 that are concave. At another position, camera system 502 includes mechanical stops 508 that are concave that mate to stop-mates 510 that are convex. As shown, these convex and the concave structures permit axial perpendicular movement 512 of lens stack 406 and lens housing 408 relative to plane 424 of image sensor 404 while prohibiting, on full contact, axial parallel movements 514 relative to plane 424 of image sensor 404.

Figure 6:
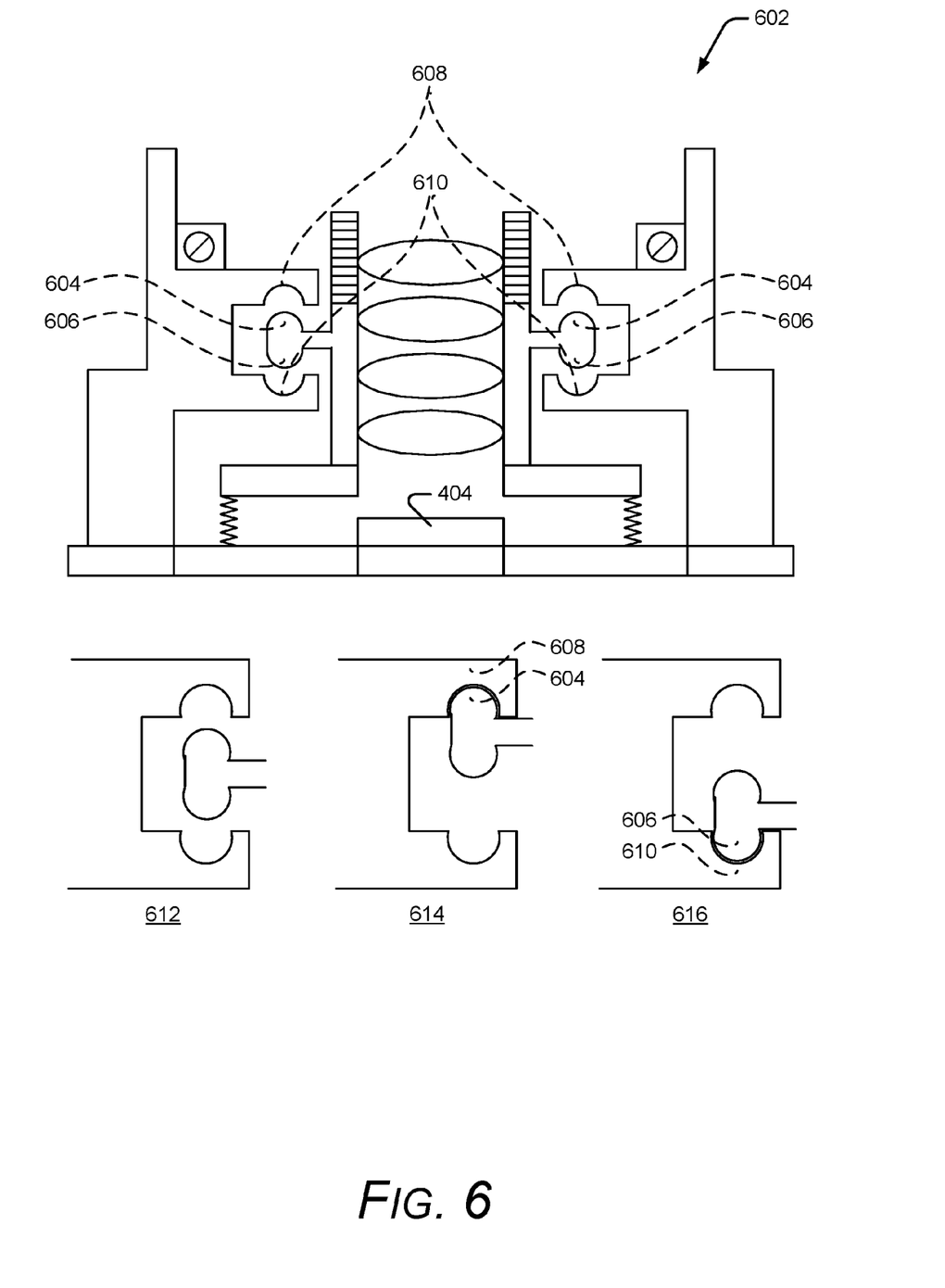
Figure 7:
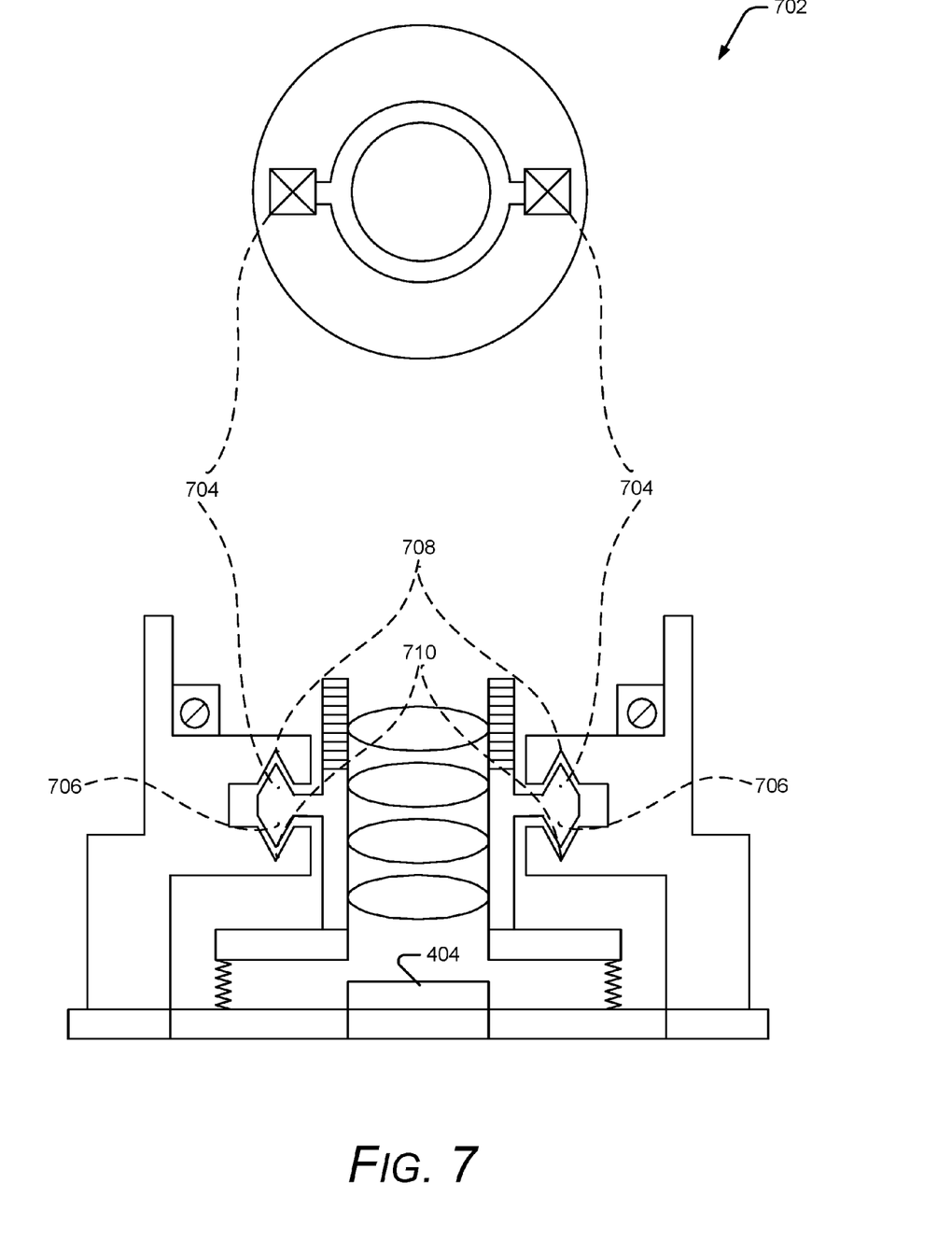

FIG. 6 illustrates a camera system 602 having convex stop-mates 604 and 606 and concave mechanical stops 608 and 610, though as part of a different configuration than FIG. 5. An optional middle position 612 and high and low positions 614 and 616, respectively, are shown in enlarged form for detail. At high position 614 (far focal position from image sensor 404) convex stop-mates 604 contact concave mechanical stops 608. At a low position 616 (closest to image sensor 404), convex stop-mates 606 contact concave mechanical stops 610. Note that in this example the convex and concave structures are matching half spheres. When in full contact, both sets of mates and stops prevent movement parallel to the plane of image sensor 404, thereby prohibiting movement of an image center of a captured scene (e.g., scene 206 of FIG. 2).

Camera system 602 includes mechanical stop-mates as part of a single structure, though each set of mates and stop-mates may be a singular structure rather than all mates or stop-mates being one structure. While not shown by this cross section of FIG. 6, the mates can be a single ring surrounding lens housing 408.

FIG. 7 illustrates a camera system 702 having convex stop-mates 704 and 706 and concave mechanical stops 708 and 710. Like FIG. 6, middle, high, and low positions can be provided, though the middle position is optional (none shown, see FIG. 6). Here, at a far focal position from image sensor 404, convex stop-mates 704 contact concave mechanical stops 708. At a near focal position from image sensor 404, convex stop-mates 706 contact concave mechanical stops 710. In this example, the convex and concave structures are narrow-to-wide and wide-to-narrow forming a point or pyramid. When in full contact, both sets of mates and stops prevent movement parallel to the plane of image sensor 404, thereby prohibiting movement of an image center of a captured scene (e.g., scene 206 of FIG. 2). Like some other mates and stops described herein, these can be two stops and mates at opposing sides of lens housing 408, three or more stops defining a plane, a consistent structure, for example, a full ring or plane, or three or more different stops and mates. FIG. 7 illustrates one particular alternative in which two convex stop-mates and stops may be used for each of the high and low positions. Here pyramids of convex stop-mates 704 and 706, along with matching concave mechanical stops 708 and 710, allow alignment, reduce tilt, and prevent parallel movement. This is shown with a top-down plan view illustrating two convex stop-mates 704.

Figure 8:
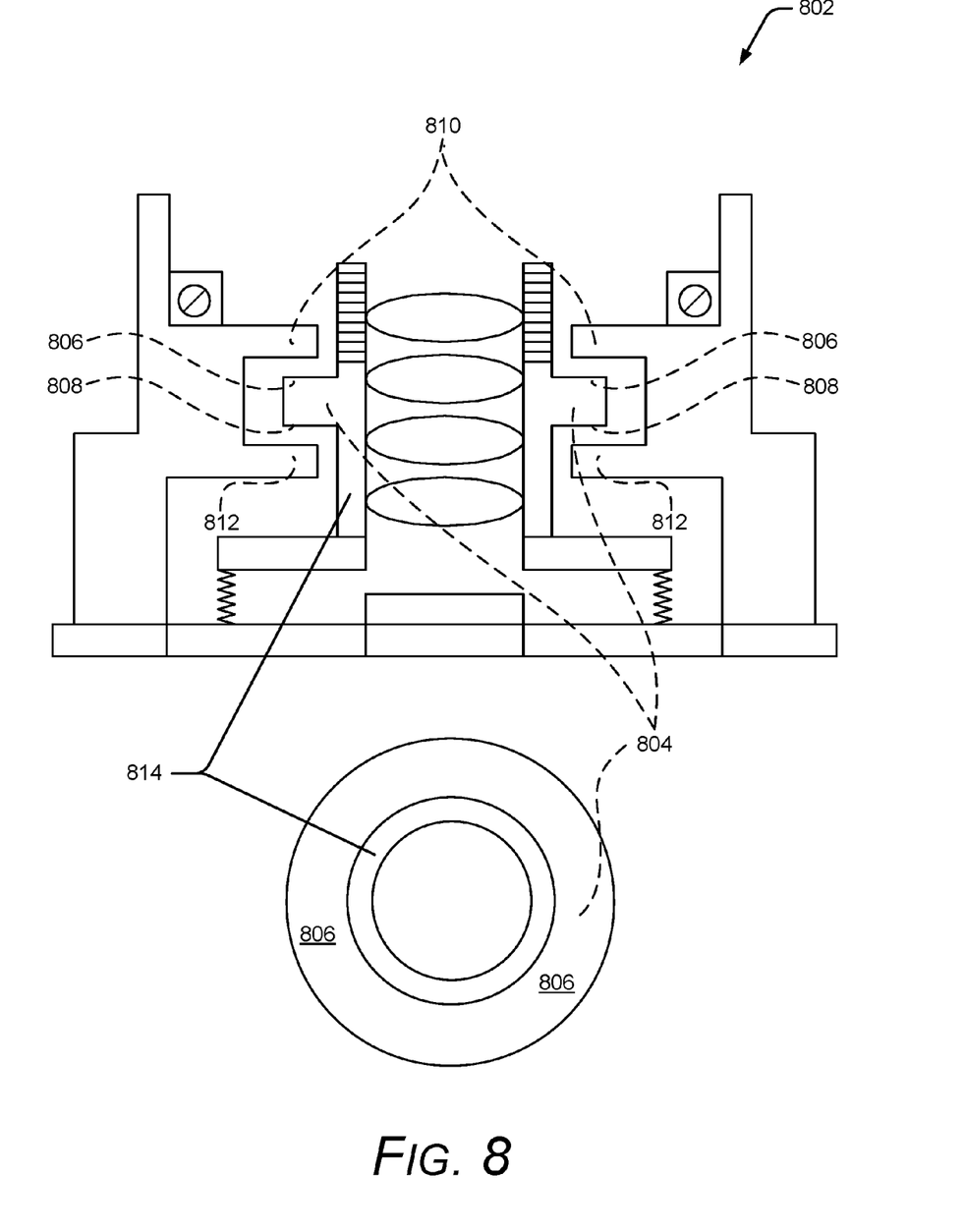
FIG. 8 illustrates a planar-ring stop-mate having mechanical stop planes configured to contact mechanical stop-mates, which are also planar and configured as rings.

FIG. 8 illustrates one such flat, consistent structure, where camera system 802 includes a planar-ring stop-mate 804 having mechanical stop planes 806 and 808 that are configured to contact mechanical stop-mates 810 and 812, respectively, which are also planar and configured as rings. Note the plan view showing mechanical stop plane 806 of planar-ring stop-mate 804 as well as their relationship to lens housing 814.

While these examples illustrate various stops and stop-mates, others are also envisioned, for example conic points or wave-cross-section rings and mates. Many of these structure prohibit cant, movement of an image center, as well as twist of a lens housing or lenses of a lens stack (twist can have negative effects in some applications of array cameras).

Figure 9:
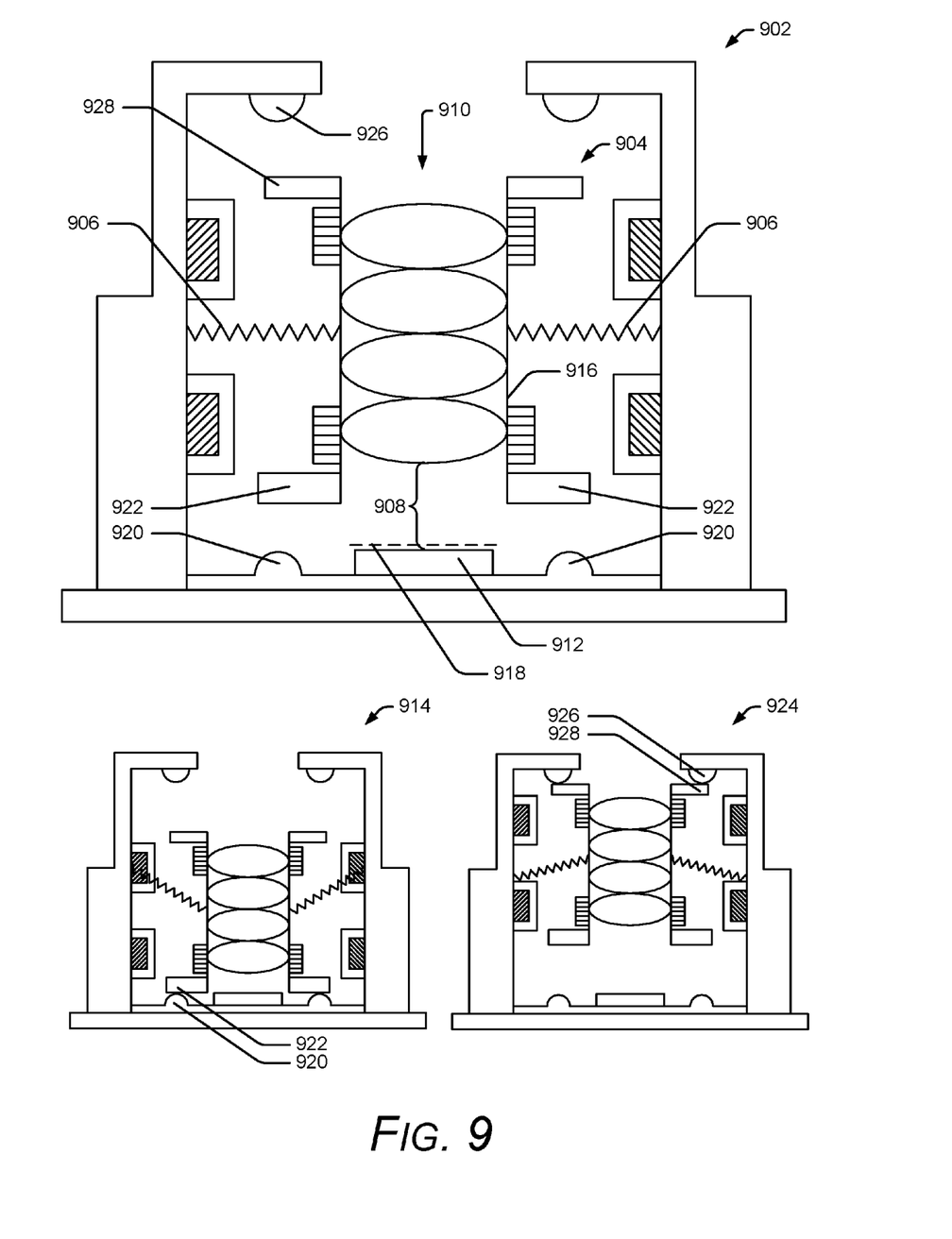
FIG. 9 illustrates a camera system having three focal positions.

While each of the above camera systems are capable of more than two positions, consider two specific examples of camera systems that have three or more positions. FIG. 9 illustrates camera system 902 having three focal positions. A middle focal position 904 does not use mechanical stops and is an equilibrium position caused by springs 906. Middle focal position 904 includes a middle focal distance 908 from a nearest lens of lenses 910 relative to image sensor 912.

FIG. 9 also illustrates a near focal position 914. Near focal position 914 prohibits cant of lenses 910 and a lens housing 916 (shown in larger illustration) relative to a plane 918 of image sensor 912 using a mechanical stop 920 and a mechanical stop-mate 922. As shown in one of the smaller illustrations, mechanical stop 920 is in contact with mechanical stop-mate 922, with each having two points shown in cross section.

Figure 10:
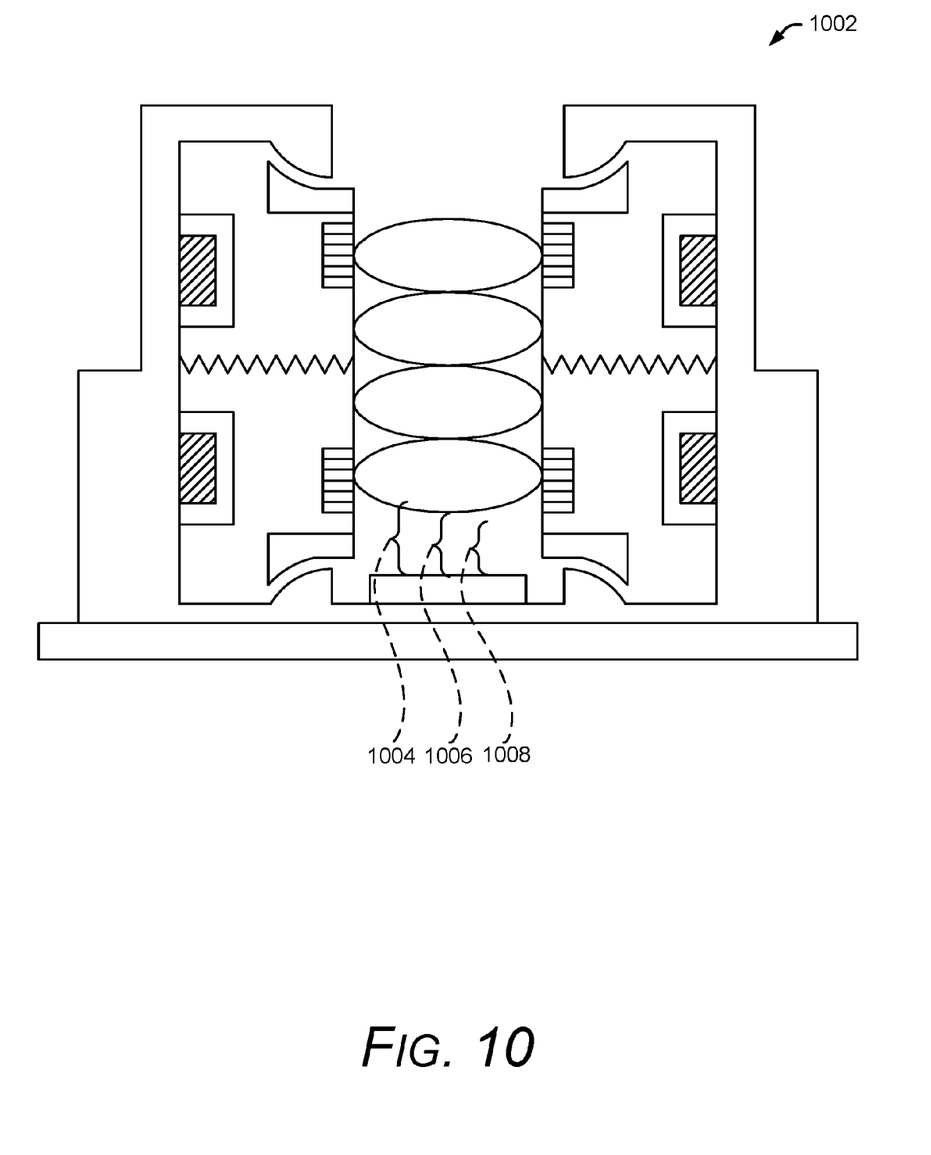
FIG. 10 illustrates a camera system having three focal positions with mechanical stops and stop-mates that reduce movement of an image center.

Far focal position 924 prohibits cant of lenses 910 within lens housing 916 (shown in larger illustration) relative to plane 918 of image sensor 912 using a mechanical stop 926 and a mechanical stop-mate 928. As shown in this smaller illustration, mechanical stop 926 is in contact with mechanical stop-mate 928, with each having two points shown in cross section. Note that the various other forms of mechanical stops and stop-mates may also be used for camera system 902, for example those shown in FIGS. 5-8. By way of one example, FIG. 10 illustrates a camera system 1002 that may also provide three or more focal positions, in this case with mechanical stops and stop-mates that further aid to reduce movement of an image center. Note that the three focal distances 1004, 1006, and 1008 in this example camera system are relatively similar. This is but one way in which some cameras, whether array cameras or otherwise, may operate.

Figure 11:
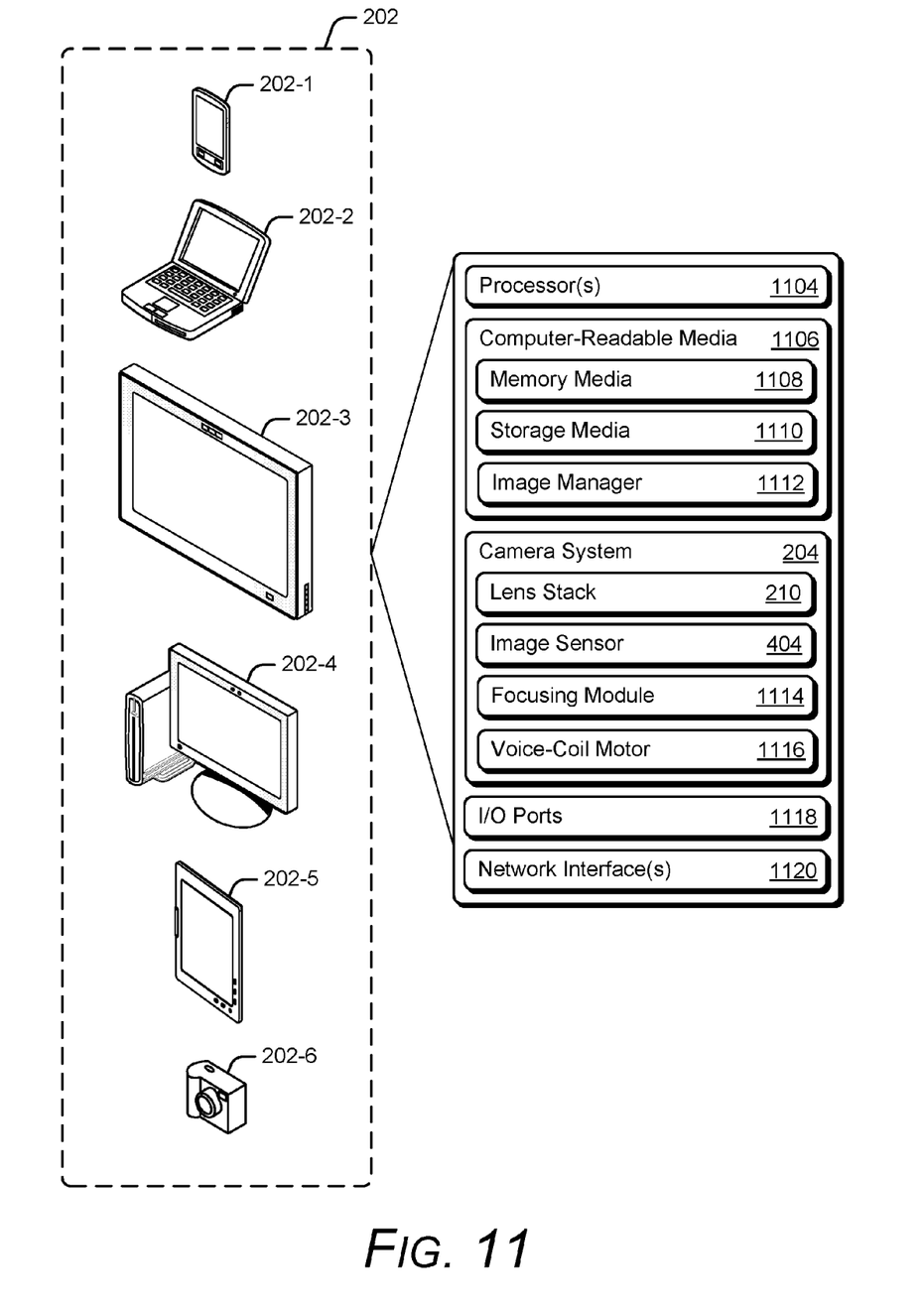
FIG. 11 illustrates the computing device of FIG. 2 in greater detail.

Having generally described camera systems, mechanical stops, and mechanical stop-mates, this discussion now turns to FIG. 11, which illustrates computing device 202 of FIG. 2 in greater detail.

Computing device 202 is illustrated with various non-limiting example devices: smartphone 202-1, laptop 202-2, television 202-3, desktop 202-4, tablet 202-5, and video and still camera 202-6. Computing device 202 includes processor(s) 1104 and computer-readable media 1106, which includes memory media 1108 and storage media 1110. Applications and/or an operating system (not shown) embodied as computer-readable instructions on computer-readable media 1106 can be executed by processor(s) 1104 to provide some or all of the functionalities described herein. Computer-readable media 1106 also includes image manager 1112. Image manager 1112 is configured to combine or process multiple images of a same scene to provide a high-quality final image. Thus, image manager 1112 may create a composite image using multiple images of the same scene, for example images captured by each of image sensors 302 of FIG. 3. As noted above, computing device 202 includes camera system 204, which in turn includes lens stack 210 and image sensor 404, as well as a focusing module 1114, which is configured to control voice-coil motor 1116. Focusing module 1114 may be software or hardware or both (e.g., as an above-mentioned auto-focus system).

Focusing module 1114, as described below, is configured to control movement of lens stack 210 (generally via lens housing 408) through control of voice-coil motor 1116. This control is effective to cause one or more focal position that are free or relatively free of cant and/or movement of an image center.

In some cases, computing device 202 is in communication with, but may not necessarily include, camera system 204 or elements thereof. Captured images are then received by computing device 202 from camera system 204 via the one or more I/O ports 1118. I/O ports 1118 can include a variety of ports, for example, by way of example and not limitation, high-definition multimedia (HDMI), digital video interface (DVI), display port, fiber-optic or light-based, audio ports (e.g., analog, optical, or digital), USB ports, serial advanced technology attachment (SATA) ports, peripheral component interconnect (PCI) express based ports or card slots, serial ports, parallel ports, or other legacy ports. Computing device 202 may also include network interface(s) 1120 for communicating data over wired, wireless, or optical networks. By way of example and not limitation, network interface 1120 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like.

Example Methods

Figure 12:
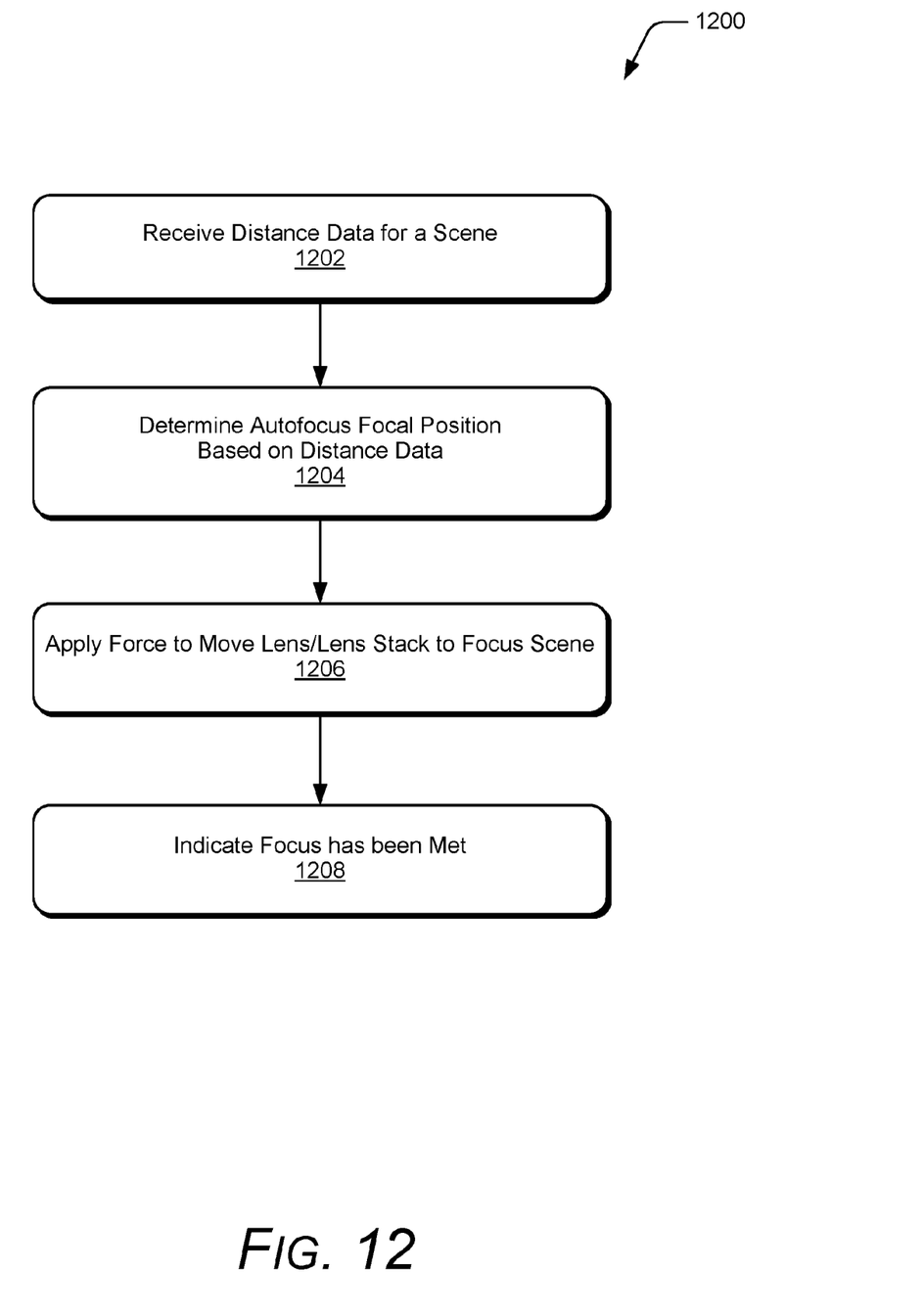
FIG. 12 illustrates example methods for controlling a voice-coil motor effective to autofocus without canting.

The following discussion describes methods by which techniques are implemented to enable use of non-canting VCM-actuated autofocus. These methods can be implemented utilizing the previously described environment and example camera systems, for example those shown in FIGS. 2-11. Aspects of these example methods are illustrated in FIG. 12, which are shown as operations performed by one or more entities. The orders in which operations of these methods are shown and/or described are not intended to be construed as a limitation, and any number or combination of the described method operations can be combined in any order to implement a method, or an alternate method.

FIG. 12 illustrates example methods 1200 for autofocusing a camera system. Note that these operations can be repeated or performed simultaneously for a camera system having multiple image sensors, lens stacks, and so forth, e.g., those described in FIG. 3.

At 1202, distance data is received for a scene. In some cases this is determined using parallax of a stereo camera to compute depth and thus distance to the scene. Distance data can be determined and received in manners known, for example through radar, infrared, SONAR, and SODAR, to name but a few. Using FIG. 2 as an example, data can be received indicating a distance to some object in scene 206, e.g., a person 212.

At 1204, an autofocus focal position is determined based on the received data distance. Assume, for illustration, that a user points the camera of her smartphone toward a person on which the distance data is based. Focusing module 1114 then determines which focal distance is appropriate to focus that person on the image sensor or sensors of the camera system. Here we assume a three position camera system 902 as shown in FIG. 9.

At 1206, a force is applied by which to move a lens or lens stack to focus the scene on an image sensor. This force can be an electromagnetic force, for example, using voice-coil motor 1116 to cause an electromagnetic force to move from a middle focal position 904 to a high focal position 924. Here focusing module 1114 controls voice-coil motor 1116 to move lens stack 910. This force can balance another force, e.g., a spring force, or can overcome a force until a mechanical stop is met. In this case, high focal position 924 is reached when mechanical stop 926 meets mechanical stop-mate 928, whereby cant is reduced or removed.

The amount of force applied can be previously determined during calibration of the camera system. In some cases, however, a feedback is provided when the mechanical stops and stop-mates meet, e.g., when completion of an electrical circuit or other electrical effect to indicate that a full contact with the stop and mate (or stops and mates if multiples).

Optionally, at 1208, an indication can be provided that the scene is in focus. This is sometimes simply showing the scene on a screen in focus, or some other indication that scene is in focus. At this point a user may select to capture an image or images of the scene or not. If an array camera, the images can be combined in some fashion to provide a resulting high quality image.

Returning briefly to FIG. 3, three images are capture of scene 206 through image sensors 302-1, 302-2, and 302-3. These are then used to create a final image. Here image sensor 302-1 captures a high-resolution, monochromatic image of scene 206. Using the other images sensors 302-2 and 302-3, two more images, both color, are captured. These three are then combined to create a high quality image. As noted in part above, this combination is aided by these techniques as both cant and movement of an image center are both reduced or eliminated. Note also that while the above example includes three image sensors, two, four, or even many image sensors can be used. Also, with higher numbers of images sensors, the techniques can further aid in enabling combination of these many images.

Example Electronic Device

Figure 13:
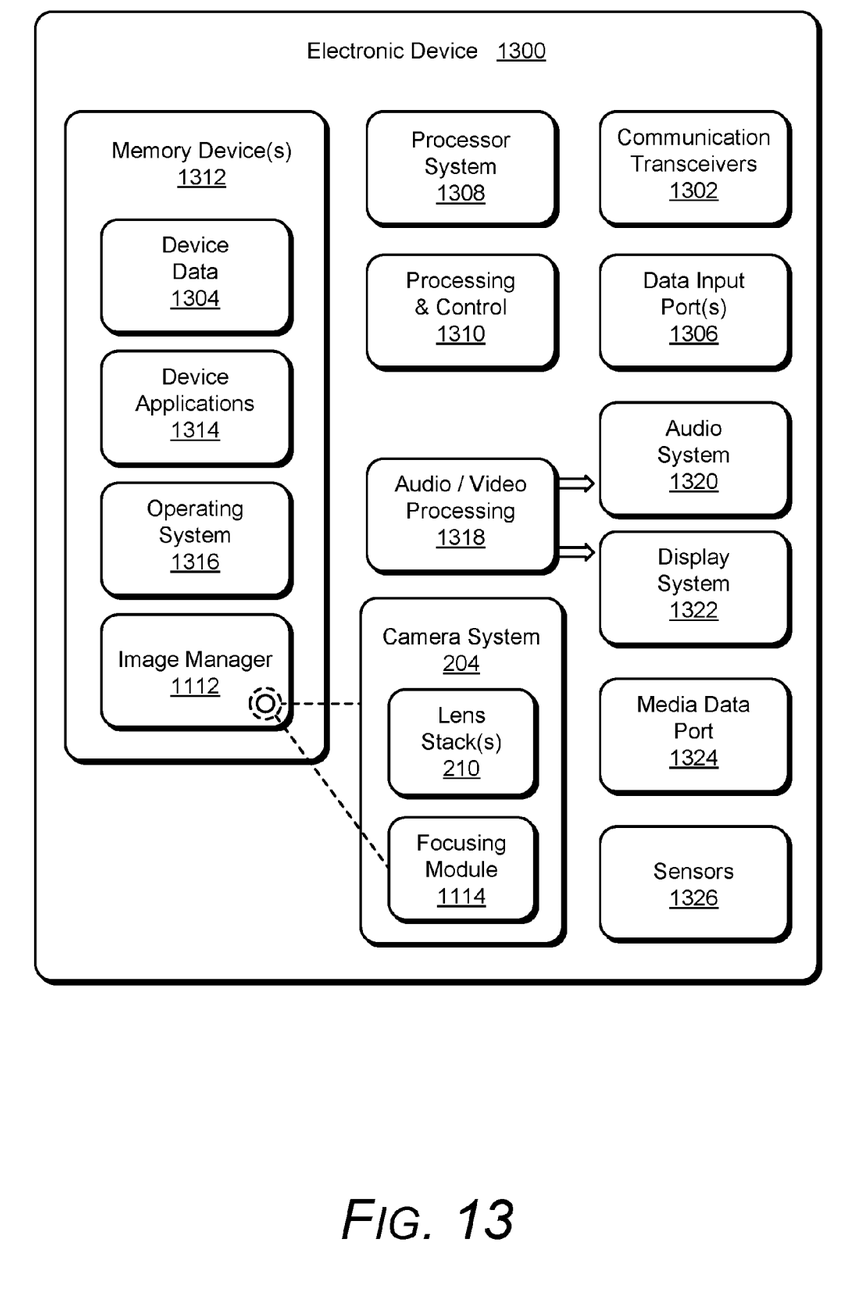
FIG. 13 illustrates various components of an electronic device that can implement non-canting VCM-actuated autofocus in accordance with one or more embodiments.

FIG. 13 illustrates various components of an example electronic device 1300 that can be implemented as a computing device and/or camera system, as described with reference to any of the previous FIGS. 2-12. The electronic device may be implemented as any one or combination of a fixed or mobile device, in any form of a consumer, computer, portable, user, communication, phone, navigation, gaming, audio, camera, messaging, media playback, and/or other type of electronic device, for example computing device 202 described with reference to FIGS. 2 and 11.

Electronic device 1300 includes communication transceivers 1302 that enable wired and/or wireless communication of device data 1304, for example, received data, transmitted data, or sensor data as described above. Example communication transceivers include NFC transceivers, WPAN radios compliant with various IEEE 802.15 (Bluetooth™) standards, WLAN radios compliant with any of the various IEEE 802.11 (WiFi™) standards, WWAN (3GPP-compliant) radios for cellular telephony, wireless metropolitan area network (WMAN) radios compliant with various IEEE 802.16 (WiMAX™) standards, and wired local area network (LAN) Ethernet transceivers.

Electronic device 1300 may also include one or more data input ports 1306 via which any type of data, media content, and/or inputs can be received, for example, user-selectable inputs, messages, music, television content, recorded video content, and any other type of audio, video, and/or image data received from any content and/or data source (e.g., other image devices or image sensors). Data input ports 1306 may include USB ports, coaxial cable ports, and other serial or parallel connectors (including internal connectors) for flash memory, DVDs, CDs, and the like. These data input ports may be used to couple the electronic device to components (e.g., camera system 204), peripherals, or accessories for example, keyboards, microphones, cameras, and printers.

Electronic device 1300 of this example includes processor system 1308 (e.g., any of application processors, microprocessors, digital-signal-processors, controllers, and the like), or a processor and memory system (e.g., implemented in a SoC), which process (i.e., execute) computer-executable instructions to control operation of the device. Processor system 1308 may be implemented as an application processor, embedded controller, microcontroller, and the like. A processing system may be implemented at least partially in hardware, which can include components of an integrated circuit or on-chip system, digital-signal processor (DSP), application-specific integrated circuit (ASIC), field-programmable gate array (FPGA), a complex programmable logic device (CPLD), and other implementations in silicon and/or other hardware.

Alternatively or in addition, electronic device 1300 can be implemented with any one or combination of software, hardware, firmware, or fixed logic circuitry that is implemented in connection with processing and control circuits, which are generally identified at 1310 (processing and control 1310). Hardware-only devices in which non-canting VCM-actuated autofocus may be embodied include those that convert, without computer processors, sensor data into voltage signals by which to control focusing systems (e.g., focusing module 1114).

Although not shown, electronic device 1300 can include a system bus, crossbar, or data transfer system that couples the various components within the device. A system bus can include any one or combination of different bus structures, for example, a memory bus or memory controller, a peripheral bus, a universal serial bus, and/or a processor or local bus that utilizes any of a variety of bus architectures.

Electronic device 1300 also includes one or more memory devices 1312 that enable data storage, examples of which include random access memory (RAM), non-volatile memory (e.g., read-only memory (ROM), flash memory, EPROM, EEPROM, etc.), or a disk storage device. Memory device(s) 1312 provide data storage mechanisms to store the device data 1304, other types of information and/or data, and various device applications 1314 (e.g., software applications). For example, operating system 1316 can be maintained as software instructions within memory device 1312 and executed by processor system 1308. In some aspects, image manager 1112 and/or focusing module 1114 is embodied in memory devices 1312 of electronic device 1300 as executable instructions or code. Although represented as a software implementation, image manager 1112 and focusing module 1114 may be implemented as any form of a control application, software application, signal-processing and control module, or hardware or firmware.

Electronic device 1300 also includes audio and/or video processing system 1318 that processes audio data and/or passes through the audio and video data to audio system 1320 and/or to display system 1322 (e.g., a screen of a smart phone or camera). Audio system 1320 and/or display system 1322 may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, e.g., media data port 1324. In some implementations, audio system 1320 and/or display system 1322 are external components to electronic device 1300. Alternatively or additionally, display system 1322 can be an integrated component of the example electronic device, for example, part of an integrated touch interface. Electronic device 1300 includes, or has access to, a camera system, which includes lens stack 210 and image sensor 302 or 404 (not shown). Sensor data is received from camera system 204 and/or image sensor 302 or 404 by image manager 1112, here shown stored in memory devices 1312, which when executed by processor system 1308 constructs a final image as noted above.

Although embodiments of non-canting VCM-actuated autofocus have been described in language specific to features and/or methods, the subject of the appended claims is not necessarily limited to the specific features or methods described. Rather, the specific features and methods are disclosed as example implementations of non-canting VCM-actuated autofocus.

What is claimed is:

1. A camera system comprising:
   an image sensor;
   a lens housing having:
      a lens-retention section configured to retain one or more lenses capable of focusing light from a scene onto the image sensor; and
      a mechanical stop-mate configured to mate with a mechanical stop;
   one or more springs;
   one or more electromagnets; and
   the mechanical stop, the mechanical stop configured to mate with the mechanical stop-mate effective to prevent cant of the lens housing relative to a planar cross section of at least one of the lenses, the planar cross section parallel to a plane of the image sensor, and further effective to prevent non-cant movement of an image center of the scene on the image sensor, the mechanical stop having a convex or concave structure and the mechanical stop-mate having another of the convex or concave structure.

2. The camera system as recited in claim 1, further comprising a second mechanical stop, the first-mentioned mechanical stop and the second mechanical stop both effective to prevent cant of the lens housing, the first-mentioned mechanical stop at a first position and the second mechanical stop at a second position, the first and second positions having different focal distances to the image sensor.

3. The camera system as recited in claim 1, wherein the mechanical stop includes three or more projections, the three or more projections arranged effective to define a stop plane, the stop plane parallel to the planar cross section and the plane of the image sensor.

4. The camera system as recited in claim 1, wherein the mechanical stop-mate comprises a ring surrounding the lens housing, the ring configured to contact the mechanical stop when in a first position and a second mechanical stop with in a second position, the first and second positions having different focal distance to the image sensor.

5. The camera system as recited in claim 1, wherein the convex and the concave structures permit axial perpendicular movement relative to the plane of the image sensor while prohibiting, on full contact, axial parallel movement relative to the plane of the image sensor.

6. The camera system as recited in claim 5, wherein the convex and concave structures are matching conic, pyramid, or narrow-to-wide structures.

7. The camera system as recited in claim 1, further comprising a second image sensor, a second lens housing having a second lens-retention section configured to retain one or more other lenses capable of focusing light from the scene onto the second image sensor and a second mechanical stop-mate configured to contact a second mechanical stop, one or more second springs, one or more second electromagnets, and the second mechanical stop configured to contact the second mechanical stop-mate effective to prevent cant of the second lens housing relative to a second planar cross section of at least one of the second lenses, the second planar cross section parallel to a second plane of the second image sensor.

8. The camera system as recited in claim 7, further comprising an image manager configured to receive first and second images from the first and second image sensors, respectively, and combine or process the first and second image sensors to create a composite image of the scene.

9. The camera system of claim 1, wherein the mechanical stop includes two additional convex or concaves structures and the mechanical stop-mate includes two additional other convex or concave structures, the convex or concave structure and the two additional convex or concave structures of the mechanical stop arranged effective to define a stop plane, the stop plane parallel to the plane of the image sensor and configured to mate with the mechanical stop-mate.

10. A method comprising:
receiving distance data for a scene;
determining an autofocus focal position based on the distance data; and
applying a force effective to move a mechanical stop-mate of a lens housing to mate with a mechanical stop, the move positioning a lens or lens stack of the lens housing into the autofocus focal position to focus the scene on an image sensor, the mate of the mechanical stop and the mechanical stop-mate prohibiting:
cant of the lens housing; and
movement of an image center of the scene on the image sensor.

11. The method of claim 10, further comprising:
applying a second force effective to move a second mechanical stop-mate of a second lens housing into contact with a second mechanical stop, the move positioning a second lens or lens stack of the second lens housing into the autofocus focal position to focus the scene on a second image sensor.

12. The method of claim 11, further comprising receiving a first image captured by the image sensor of the scene and a second image captured by the second image sensor and creating a composite image using the first image and the second image.

13. The method of claim 10, further comprising:
receiving second distance data;
determining a second autofocus focal position based on the second distance data, the second autofocus focal position different from the first-mentioned autofocus focal position; and
applying a second force effective to move the mechanical stop-mate of the lens housing to mate with a second mechanical stop, the move positioning the lens or lens stack of the lens housing into the second autofocus focal position.

14. The method of claim 10, further comprising:
receiving third distance data;
determining a third autofocus focal position based on the third distance data, the third autofocus focal position different from the first-mentioned autofocus focal position and the second autofocus focal position; and
powering an electromagnet effective to balance a spring force of a mechanical spring or springs at the first or second autofocus focal position, the balancing providing the third autofocus focal position.

15. A camera system configured to provide three focal positions, the camera system comprising:
a first focal position prohibiting cant of lenses within a lens housing relative to a plane of an image sensor using a first mechanical stop and a first mechanical stop-mate, the first mechanical stop including three or more projections, the three or more projections arranged effective to define a stop plane, the stop plane parallel to the plane of the image sensor and configured to contact the first mechanical stop-mate;
a second focal position prohibiting cant of the lenses within the lens housing relative to the plane of the image sensor using a second mechanical stop and a second mechanical stop-mate; and
a third focal position between the first and second focal position, the third focal position enabling focus of a scene on the image sensor at focal distances less that the first position and greater than the second position.

16. The camera system of claim 15, further comprising:
springs having a spring force by which the first position or the second position is provided; and
electromagnets having a magnetic force when provided a current by which another of the first position or the second position is provided.

17. The camera system of claim 15, wherein the first and second stop-mates are within a same ring-shaped structure integral with the lens housing.

18. The camera system of claim 15, further comprising a focusing module configured to provide a force by which to provide the first or second position.

19. The camera system of claim 18, wherein the focusing module powers an electromagnet effective to balance a spring force of a mechanical spring or springs at the first or second position, the balancing providing the third position.

20. The camera system of claim 15, wherein the three or more projections are convex structures and the first mechanical stop-mate includes three or more concave structures effective to mate the first mechanical stop with the first mechanical stop-mate.

* * * * *